(12) United States Patent
Uchida et al.

(10) Patent No.: US 10,316,390 B2
(45) Date of Patent: Jun. 11, 2019

(54) METHOD FOR PURIFYING METALLIC SODIUM

(71) Applicants: NITTAN VALVE CO., LTD., Kanagawa (JP); SUKEGAWA ELECTRIC CO., LTD., Ibaraki (JP)

(72) Inventors: Shigeru Uchida, Kanagawa (JP); Ryo Onose, Kanagawa (JP); Koichi Homma, Kanagawa (JP); Kuniaki Miura, Ibaraki (JP); Masashige Hanawa, Ibaraki (JP)

(73) Assignees: NITTAN VALVE CO., LTD., Kanagawa (JP); SUKEGAWA ELECTRIC CO., LTD., Ibaraki (JP)

( * ) Notice: Subject to any disclaimer, the term of this patent is extended or adjusted under 35 U.S.C. 154(b) by 0 days.

(21) Appl. No.: 15/564,332

(22) PCT Filed: Jan. 29, 2016

(86) PCT No.: PCT/JP2016/052635
§ 371 (c)(1),
(2) Date: Oct. 4, 2017

(87) PCT Pub. No.: WO2017/130375
PCT Pub. Date: Aug. 3, 2017

(65) Prior Publication Data
US 2018/0142324 A1 May 24, 2018

(51) Int. Cl.
*B01D 8/00* (2006.01)
*C22B 9/02* (2006.01)
(Continued)

(52) U.S. Cl.
CPC ............... *C22B 26/10* (2013.01); *B01D 8/00* (2013.01); *B01D 53/1493* (2013.01); *C22B 9/02* (2013.01);
(Continued)

(58) Field of Classification Search
CPC .. C22B 9/02; C22B 26/10; C23G 5/00; B01D 8/00; B01D 53/1493; B01D 2257/70; Y02A 50/235
See application file for complete search history.

(56) References Cited

U.S. PATENT DOCUMENTS 2,798,831 A * 7/1957 Willcox ................... B01J 33/00
148/264
4,191,558 A * 3/1980 Gould ....................... C22B 9/02
210/187

(Continued)

FOREIGN PATENT DOCUMENTS

| CN | 203700465 U | 7/2014 |
|---|---|---|
| JP | 3-18605 A | 1/1991 |

(Continued)

OTHER PUBLICATIONS

Written Opinion of the International Searching Authority dated May 10, 2016 in the corresponding application PCT/JP2016/052635.

*Primary Examiner* — Tima M McGuthry-Banks
(74) *Attorney, Agent, or Firm* — Roberts Mlotkowski Safran Cole & Calderon P.C.

(57) ABSTRACT

It is preferable that metallic sodium to be loaded to an engine valve used for an internal combustion engine such as automobile engine have high purity. However, conventionally, an organic solvent remaining in micropores on a surface of the metallic sodium have been hardly attracted attention. Provided is a method for purifying metallic sodium including steps of placing metallic sodium containing organic solvent in the micropores thereof in a melting tank which is sealed, and heating the melting tank under reduced pressure to vaporize and remove the organic solvent coating the metallic sodium.

5 Claims, 3 Drawing Sheets

(51) Int. Cl.
*C23G 5/00* (2006.01)
*B01D 53/14* (2006.01)
*C22B 26/10* (2006.01)
C22B 5/16 (2006.01)
C22B 9/00 (2006.01)
F01L 3/14 (2006.01)

(52) U.S. Cl.
CPC ............ *C23G 5/00* (2013.01); *B01D 2257/70* (2013.01); *C22B 5/16* (2013.01); *C22B 9/006* (2013.01); *F01L 3/14* (2013.01)

(56) References Cited

U.S. PATENT DOCUMENTS

| | | | | |
|---|---|---|---|---|
| 4,693,088 | A * | 9/1987 | Latge | B01D 8/00 |
| | | | | 165/119 |
| 6,086,652 | A * | 7/2000 | Mulvaney, III | C22B 9/02 |
| | | | | 266/227 |
| 2015/0232964 | A1* | 8/2015 | Zhang | C22B 9/02 |
| | | | | 75/589 |

FOREIGN PATENT DOCUMENTS

| | | |
|---|---|---|
| JP | 4-272413 A | 9/1992 |
| JP | 2013-112550 A | 6/2013 |

* cited by examiner

METHOD FOR PURIFYING METALLIC SODIUM

CROSS-REFERENCE TO RELATED APPLICATIONS

The present application is a U.S. National Phase of PCT/JP2016/052635 filed on Jan. 29, 2016. The disclosure of the PCT Application is hereby incorporated by reference into the present Application.

FIELD OF THE INVENTION

The present invention relates to a method for purifying metallic sodium, and in particular, relates to a method for purifying metallic sodium to be put into a hollow engine valve used for an internal combustion engine.

BACKGROUND ART

Since an engine valve, particularly an exhaust valve, used for an internal combustion engine, such as an automotive engine, is exposed to high temperature, the engine valve is configured hollow and put with metallic sodium inside the valve stem thereof. Though metallic sodium to be put is solid at room temperature, it has a melting point of about 98° C. and thus liquefied at about 100° C. of relatively low temperature. Accordingly, when the valve is warmed by activating engine, the metallic sodium become liquid and is shaken in the valve stem owing to a vertical movement of the valve, thereby heat transferred from a combustion chamber to a valve head is conducted through the valve stem, so as to dissipate to a water jacket of a cylinder head through a valve guide contacting with the valve stem. Thus, overheat of the combustion chamber is prevented by cooling of the engine valve. Moreover, since a specific gravity of metallic sodium is 0.97, i.e. less than that of water, the valve loaded with metallic sodium can contribute to light-weighting of the entire valve.

Metallic sodium has a strong reducing action so that it deoxidizes water to generate hydrogen and to change itself to sodium hydroxide. Therefore, in order to prevent it from being oxidized and to stably preserve it for a long period of time, metallic sodium is stored under the condition where it is immersed in an organic solvent, such as kerosene, liquid paraffin (a mixture of relative long-chain saturated hydrocarbons, having a boiling point of several hundred degrees) or the like, with blocking water and air. Besides, each of kerosene and liquid paraffin has a less specific gravity than metallic sodium, so that metallic sodium is securely blocked from water and air without floating on the surface of such solvents.

The valve stem of the engine valve can be loaded with such metallic sodium which is stored in an organic solvent by taking out a bulk body of metallic sodium immersed in the organic solvent from the solvent, melting the metallic sodium, pouring the metallic sodium in a melting state into the stem portion of the engine valve and then cooling the valve, or cutting a bulk body of the metallic sodium into a predetermined size small enough to be loaded into the engine valve and then loading it.

However, a surface of the bulk body of metallic sodium taken out from the organic solvent is coated with kerosene or liquid paraffin. Because such kerosene or liquid paraffin may inhibit a heat transfer of the metallic sodium in the melting state in the engine valve, the bulk body of the metallic sodium is utilized after wiping off such kerosene or liquid paraffin. Further, comparing kerosene with liquid paraffin, the latter contains fewer impurities. Accordingly, use of the bulk body of the metallic sodium immersed in the liquid paraffin more easily achieves to obtain the metallic sodium having higher purity capable of being used for many purposes.

On the surface of a commercially available metallic sodium, some cracks may occur. Melting a bulk body of the metallic sodium with the cracks to form liquid metallic sodium causes inconveniences, for example, contamination by impurities such as kerosene, liquid paraffin. For this reason, in order to obtain only metallic sodium surely, firstly, a quantity of the metallic sodium is determined on the basis of the volume thereof. Secondly, the cracks in the surface of the metallic sodium are removed by cutting out the surface including the cracks. Then, the metallic sodium is utilized. Thus, conventionally, as a result of separate examination of a surface condition of each bulk body of the metallic sodium, some whose surface condition is good are melted and purified after wiping out liquid paraffin, or the like and others which the cracks occur in the surface are melted after cutting out the surface relatively thick. However, this method needs an examination for each metallic sodium ingot and a time-consuming operation of cutting out the surface of the defective metallic sodium. Further, this method has a drawback of reducing a manufacturing yield of purified metallic sodium due to cut-out metallic sodium chips.

Further, the metallic sodium taken out from the organic solvent unavoidably comes in contact with atmospheric oxygen to be oxidized at the surface thereof to form sodium oxide. This is a factor to make it impossible to use such metallic sodium taken from the organic solvent for purposes requiring high purity.

As mentioned above, the metallic sodium loaded into a hollow engine valve vertically moves in the valve stem, so that heat in the combustion chamber is dissipated toward the cylinder head. However, a contamination of the metallic sodium by liquid paraffin or kerosene causes a carbonization of such liquid paraffin or kerosene and inhibition of movement of liquid metallic sodium. That lead to inhibition of a cooling effect, so that the heat of the combustion chamber cannot be sufficiently dissipated. Consequently, a deterioration of fuel consumption and a bad influence on the durability of constituent materials of the engine valve may occur.

RELATED ART DOCUMENT(S)

Patent Document

[Patent Document 1] Japanese Patent Application Laid-Open 2013-112550

SUMMARY OF THE INVENTION

Problems to be Solved by Invention

As a conventional method for purifying metallic sodium, Patent Document 1 discloses a method for purifying sodium highly comprising steps of cooling melted metallic sodium to a temperature near a melting point of the metallic sodium, filtrating a cooled metallic sodium in the melting state by a cold trap, precipitating impurities such as sodium oxides dissolved in the melted metallic sodium accompanied with a drop in temperature and filtrating the precipitated solid impurities by means of metal filter. However, conventional arts such as Patent Document 1 do not pay attention to a removal of liquid paraffin or kerosene in which the metallic sodium is immersed before purification. As mentioned above, if the liquid paraffin or kerosene is loaded into an engine valve together with the metallic sodium, overheat of the engine valve and a combustion chamber may occur due to a reduction of cooling effect. Even if trying to cool the metallic sodium coated with liquid paraffin, for example, to a temperature near its melting point and to filtrate it by means of a filter, the filter is most likely clogged with the liquid paraffin of kerosene, thereby becomes unusable in a short time.

An object of the present invention is to provide a method for purifying metallic sodium, which enables a sufficient removal of organic solvents, such as paraffin or kerosene, from the metallic sodium prior to utilization in an internal combustion engine, etc., though a necessity for removal of the organic solvent has not been recognized, and which enables collective melting and purification of the metallic sodium without examining a surface condition of each metallic sodium ingot.

Means for Solving Problems

In order to achieve the above object, according to a first aspect of the present invention, a method for purifying metallic sodium containing a first organic solvent includes steps of placing the metallic sodium in a melting tank which is sealed, and heating the melting tank under reduced pressure to vaporize and remove the first organic solvent coating the metallic sodium.

(Function) According to the above aspect, regardless of the surface condition of a bulk body of the metallic sodium before purification, particularly a presence or absence of cracks, the bulk body of the metallic sodium is melted and heated under reduced pressure. Accordingly, the first organic solvent such as liquid paraffin that has been on the surface of the bulk body of the metallic sodium and has deeply entered the bulk body of the metallic sodium via small gaps of the surface thereof comes up and vaporizes, so as to be removed from the melted metallic sodium. Subsequently, by solidifying again the melted metallic sodium, a highly purified metallic sodium which does not substantially contain the organic solvent can be obtained.

A commercially available metallic sodium is usually preserved with immersed in organic solvent such as kerosene, liquid paraffin and the like. These organic solvents have boiling points of several hundred degrees under atmospheric pressure while the metallic sodium may ignite at about 300° C. According to the present invention, the organic solvent can be removed at a relatively low temperature of 200° C. or less, for example, around 170° C., thanks to heating under reduced pressure. Accordingly, the present invention is advantageous in view of an energy efficiency and can suppress risks of degradation of the organic solvent, catching fire of the organic solvent, and ignition of the metallic sodium to the minimum level.

As mentioned above, in the conventional purification of metallic sodium, according to the result of a separate examination of a surface condition of each bulk body of the commercially available metallic sodium subjected to the purification, a different purification process is employed depending on the presence or absence of cracks on the surface. On the contrary, the present invention can lead every bulk body of the metallic sodium to the same melting condition, thanks to a collective melting of the metallic sodium subjected to a purification regardless of the presence or absence of cracks on the surface before melting. Moreover, the separate examination of the surface condition of the metallic sodium is not required. Further, cutting out of the surface of the metallic sodium in the case of detection of the cracks is neither required. Thus, the number of steps can be reduced and a waste of the metallic sodium accompanied with cutting out of the surface can be avoided. In addition, an occurrence of an error in a determination of the quantity of the metallic sodium after purification on the basis of the volume thereof only can be avoided.

According to a second aspect of the present invention, in the method for purifying metallic sodium according to the first aspect, the first organic solvent which is vaporized is introduced to a solvent trap filled with a second organic solvent outside of the melting tank and is caught in the second organic solvent.

(Function) According to this aspect, dissolving the first organic solvent such as liquid paraffin removed from the melted metallic sodium into the second organic solvent prevents the first organic solvent from being discharged to the living environment. Besides, a small splash of the melted metallic sodium is trapped by the second organic solvent accompanied with an evaporation flow of the first organic solvent such as liquid paraffin, so that it can be prevented from discharging to the living environment. In particular, it is advantageous to use the same organic solvents for the first and second organic solvent from the point of view of recycling and reuse.

According to a third aspect of the present invention, in the method for purifying metallic sodium according to the first or second aspect, a sodium oxide layer formed by oxidization of the metallic sodium and covering a surface of the melted metallic sodium in the melting tank is physically removed.

(Functions) Metallic sodium, particularly, a commercially available metallic sodium is oxidized at the surface thereof to form a sodium oxide (having a melting point of 1132° C.) inevitably as long as there exists even a quite small amount of water or oxygen. In melting the metallic sodium containing the sodium oxide, a sodium oxide layer which is porous and solid is formed on the surface of the melted metallic sodium because a bulk specific gravity of the sodium oxide is less than that of the melted metallic sodium due to the porosity of the sodium oxide formed on the surface. The sodium oxide layer shut off the melted metallic sodium from surrounding atmosphere, so that the sodium oxide layer prevents the first organic solvent inside the melted metallic sodium from vaporizing and dispersing into the atmosphere, accordingly, it becomes impossible to achieve purification of the metallic sodium.

In the conventional purification, in order to remove the metallic sodium oxide, which is contained at a small amount in an unpurified metallic sodium and has a melting point higher than that of the metallic sodium, from the metallic sodium, the unpurified metallic sodium is heated under ordinary pressure in such a manner as to melt the metallic sodium and not to melt the metallic sodium oxide. And then, impurities of the metallic sodium, or the metallic sodium oxide mainly composed of a sodium oxide, are filtrated. This method of the combination of heating under ordinary pressure and filtration has drawbacks of complication in the filtration operation and possibility of clogging in a filter media and a porous metal.

On the contrary, according to this aspect, the metallic sodium is melted by heating the metallic sodium at a temperature at which the metallic sodium is melted but the sodium oxide is not melted to form the sodium oxide, which has a bulk specific gravity less than that of the metallic sodium, so as to form a thin layer on the surface of the melted metallic sodium. Then, the sodium oxide layer covering the surface of the melted metallic sodium is removed by physical means, such as a manual scoop and mechanical removal using a net. Thereby, the melted metallic sodium is directly exposed to a surrounding vaporizing environment so that the removal of the first organic solvent can be achieved.

According to a fourth aspect of the present invention, a method for purifying metallic sodium according to the first or second aspect further includes a step of breaking at least a part of a sodium oxide coating layer by applying force to the sodium oxide layer which is formed by oxidation of the metallic sodium and covering the surface of melted metallic sodium in the melting tank.

(Function) In this aspect, the melted metallic sodium can be ensured to contact with surrounding atmosphere while remaining the sodium oxide layer, which is an inhibiting factor in a purification of the metallic sodium, in the melting tank. In other words, a stirring element capable of rotating driven from outside using a motor is put in the melting tank to generate a spiral flow by rotations of the stirring element, and then the sodium oxide layer is broken by the spiral flow. Alternatively, a propeller or stirring rod is inserted into the melting tank through a wall of the melting tank from outside, and then the sodium oxide layer is broken by a manual or mechanical movement of the propeller or stirring rod. As same as the third aspect, the melted metallic sodium is directly exposed to a surrounding vaporizing environment by removing the sodium oxide layer coating the surface of the melted metallic sodium, so that the removal of the first organic solvent can be achieved.

According to a fifth aspect of the present invention, in a method for purifying metallic sodium according to any one of the first, second and third aspects, a cold trap for removing metal oxide is installed downward of the melting tank.

(Function) This aspect is intended to remove the oxide dissolved in the melted metallic sodium by cooling the melted metallic sodium to a temperature near to the melting point thereof to precipitate the melted and contaminating oxide and passing the melted metallic sodium through the cold trap to remove the metal oxide by means of filtration in the case where even a small amount of impurities mainly composed of the sodium metallic oxide is melted and mixed in the melted metallic sodium outputted from the melting tank after removal of the liquid paraffin or the like. Further highly purified metallic sodium can be obtained by the combination of the removal of the first organic solvent using the melting tank and the filtration of the oxide using a cold trap.

Effects of the Invention

According to the aspects of the present invention, highly purified metallic sodium which does not contain an organic solvent substantially can be obtained as an organic solvent coating the surface of a bulk body of metallic sodium is vaporized toward surrounding vaporizing environment to be removed by treating the metallic sodium placed in a melting tank under reduced pressure and heating state. Further, an existence of defects such as cracks or the like does not affect purification of the metallic sodium since commercially available metallic sodium as a material is melted during purification. Accordingly, it is not required to exam a surface condition of each metallic sodium ingot as a material, unlike a conventional manner, so that operability is improved. Also, a reduction of yield of the metallic sodium capable of being used due to cutting off of cracks is prevented.

DESCRIPTION OF THE EMBODIMENTS

Embodiments of the present invention will now be described with reference to the accompanying drawings, but are not limited to.

A first and second embodiments are illustrated as a series of a system for purifying metallic sodium and loading a cylinder with the metallic sodium obtained by purification, but the can be used only for purifying metallic sodium. Further, a cold trap stated below mainly aimed to remove metallic sodium oxide. Thus, if it is unnecessary to remove such metallic sodium oxide, the cold tap need not be installed.

Figure 1:
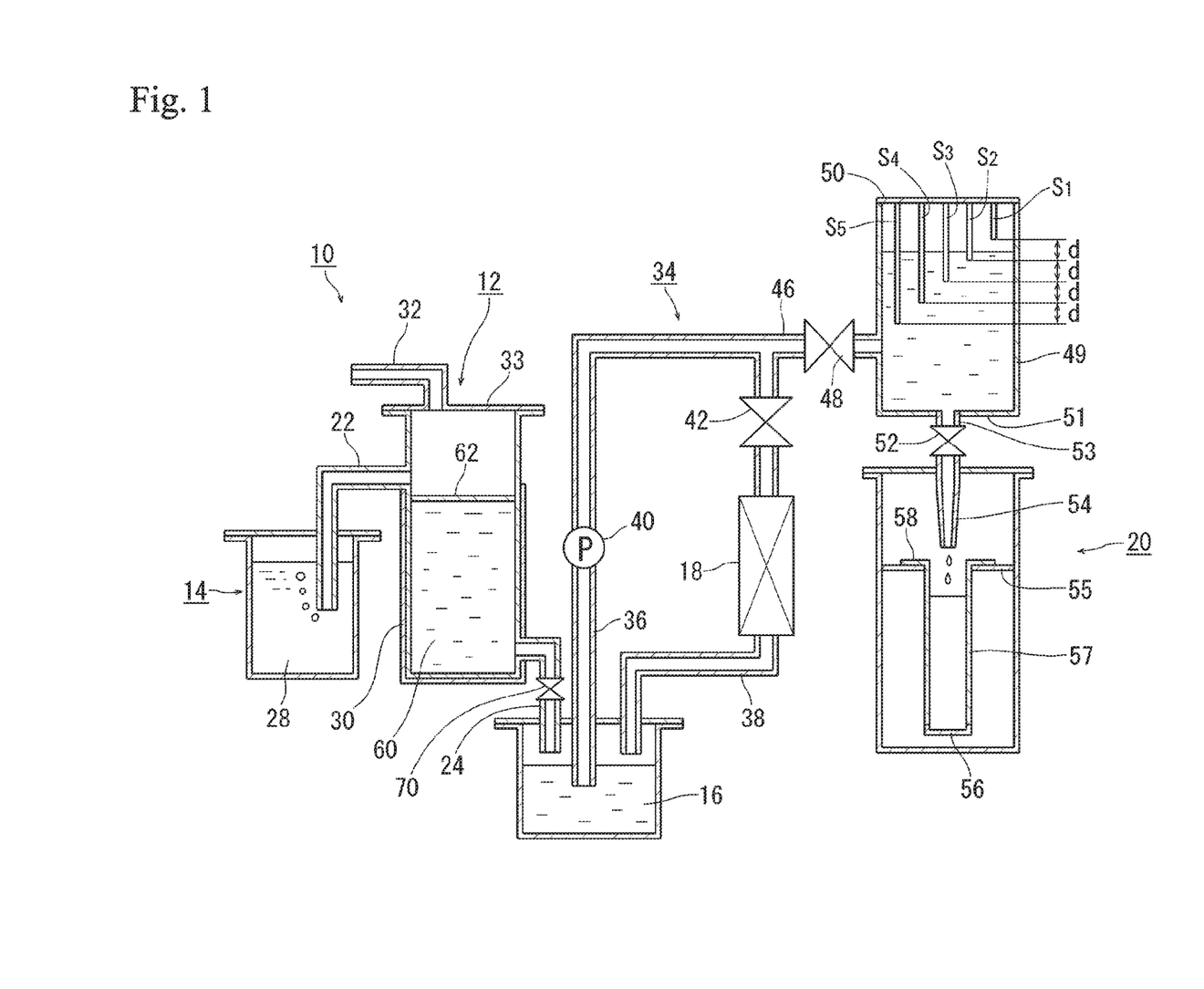
FIG. 1 is an entire constitution diagram illustrating a system for purifying and loading metallic sodium according to the first embodiment of the present invention.

As shown in FIG. 1, a system for purifying and loading metallic sodium 10 according to the first embodiment mainly includes a melting tank 12, solvent trap 14, reservoir tank 16, cold trap 18 and loading device 20.

The melting tank 12 is a cylindrical container with a bottom, to which a pressure-reducing suction pipe 22 is connected at the upper side surface thereof, and a purified-metallic-sodium-discharge pipe 24 and valve 70 are connected at the lower side surface thereof. The pressure-reducing suction pipe 22 is connected to the solvent trap 14 filled with an organic solvent 28 such as liquid paraffin and one end thereof reaches in the organic solvent 28. The solvent trap 14 is configured in such a manner as to keep inside thereof under reducing pressure by a decompression pump (not shown). The purified-metallic-sodium-discharge pipe 24 is connected to the reservoir tank 16 via the valve 70.

The melting tank 12 is provided with a heater 30 on entire side surface below the pressure-reducing suction pipe 22 and the bottom surface. The melting tank 12 is sealed by fixing a lid 33 at an upper opening thereof and the lid 33 is connected with an inert-gas supply pipe 32.

The reservoir tank 16 is a closed tank for reserving temporally the metallic sodium which is purified in the melting tank 12 and supplied to the reservoir tank 16 via the purified-metallic-sodium discharge pipe 24. The reservoir tank 16 is connected with a carrier pipe 36 and return pipe 38 of a purified-sodium circulation line 34, in addition to the purified-metallic-sodium discharge pipe 24. The carrier pipe 36 is branched into two at an opposite end to the end connected with a circulation pump 40, one of the two branches configures the other end of the return pipe 38 and is connected to the reservoir tank 16 via a first electromagnetic valve 42 and the cold trap 18.

The other of the two branches configures a loading-device supply pipe 46. The loading-device supply pipe 46 is connected to a quantitative supply device 49 via a second electromagnetic valve 48. In the illustrated example, the lower surface of a top plate 50 of the quantitative supply device 49 is electrically connected with five liquid-level detection sensors $S_1$ to $S_5$, each having different length.

Differences in the lengths in the vertical direction between each pair of adjacent sensors are the same length of "d". The quantitative supply device 49 is electrically connected with a supply pipe 53 having a quantitative supply valve 52 at the bottom plate 51. The supply pipe 53 extends to the loading device 20 and is equipped with a sodium dripping nozzle 54 at one end thereof. The loading device 20 is mounted inside thereof with a doughnuts-shaped support 55 to come into contact with the inner circumferential surface of the loading device 20. The loading device 20 is equipped inside thereof with a cylinder 57 having a cylindrical shape and a flange 58, on the lower end of which a cap 56 having a disk shape is detachably attached in such a way that the flange 58 is engaged with a center opening of the support located directly under the sodium dripping nozzle 54.

Next, a function of the system for purifying and loading metallic sodium according to this embodiment, which has the configuration as mentioned above, will be described.

In FIG. 1, a suitable amount of liquid paraffin is put in the solvent trap 14 and the lid 33 of the melting tank 12 is taken off. A bulk body of unpurified metallic sodium that has been immersed and stored in the liquid paraffin is put in the melting tank 12 after wiping off the liquid paraffin with a cloth from the bulk body, and then the lid 33 is attached again. After that, by supplying an inert gas such as argon or nitrogen from the inert-gas supply pipe 32, inside of the melting tank 12 is made under inert gas atmosphere so as to be sufficiently blocked from water and oxygen.

Then, by activating the decompression pump (not shown), insides of the solvent trap 14 and the melting tank 12 are made under reduced pressure. Heating the bulk body of the metallic sodium in the melting tank 12 by energizing the heater 30 allows the liquid paraffin coating the bulk body of the metallic sodium to vaporize to be introduced into the solvent trap 14. The liquid paraffin is absorbed into the liquid paraffin 28 in the solvent trap 14, and thus a purification of the metallic sodium is completed.

It cannot be avoided that commercially available metallic sodium contacts a small amount of water and oxygen to be oxidized at the surface to form sodium oxide, even though the commercially available metallic sodium is stored in an organic solvent such as liquid paraffin or the like. Likewise, a formation of sodium oxide by oxidization of the surface of the metallic sodium in this embodiment cannot be avoided even though a purification operation according to this embodiment is performed under inert gas atmosphere substantially including no water and no oxygen. The sodium oxide formed on the surface has a bulk specific gravity less than that of metallic sodium due to the porosity of the sodium oxide. Accordingly, as shown in FIG. 1, the sodium oxide floats on the surface of the melted metallic sodium 60 to form a sodium oxide layer 62 when the metallic sodium in the melting tank is melted completely.

Due to the existence of the sodium oxide layer 62, the melted metallic sodium 60 cannot come into contact with the atmosphere in the melting tank 12. Even if the liquid paraffin in the melted metallic sodium 60 tries to vaporize, it cannot escape from the melted metallic sodium 60 so that purification of the metallic sodium cannot proceed. In order to avoid such situation, the sodium oxide layer 62 on the surface of the melted metallic sodium 60 can be scooped manually or mechanically with the lid 33 taken off, or, for example as shown in FIG. 2, at least a part of the sodium oxide layer 62 can be broken by generating a forcible flow with a stirring element.

Figure 2:
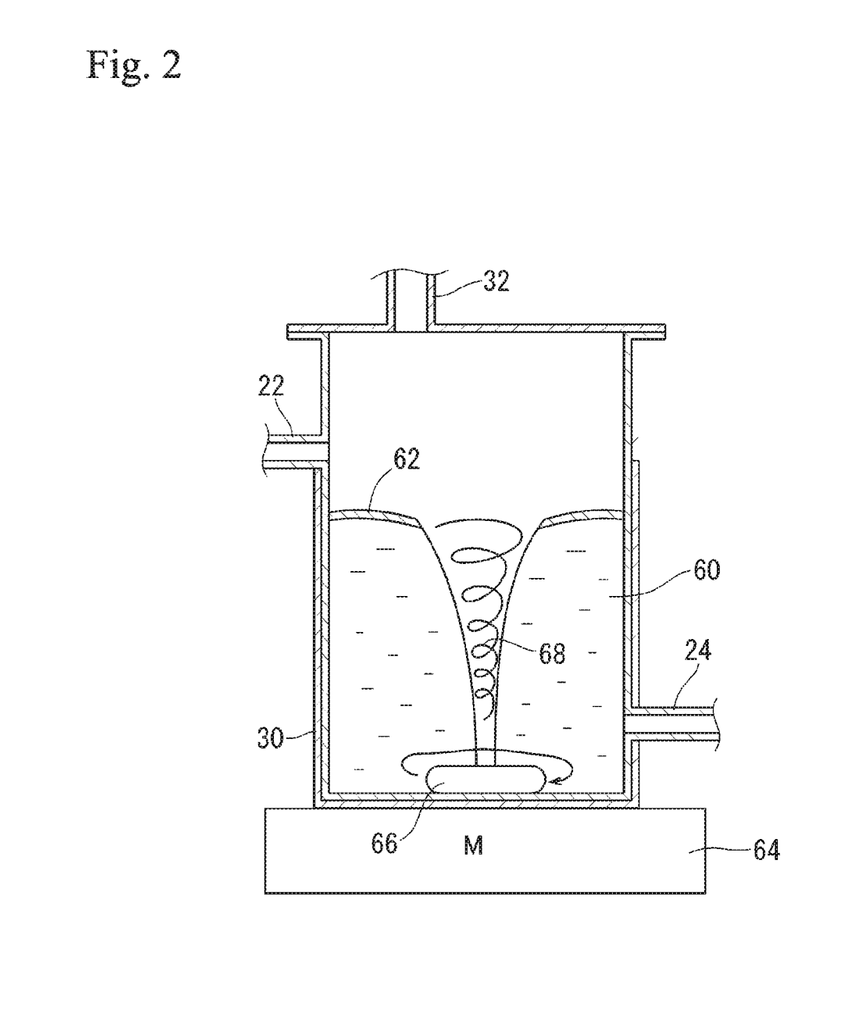
FIG. 2 is a longitudinal sectional view illustrating a variation of the melting tank shown in the entire constitution diagram of FIG. 1.

FIG. 2 is a longitudinal sectional view illustrating a variation of the melting tank shown in the entire constitution diagram of FIG. 1. The same components as FIG. 1 are indicated by the same numeral references and a detailed description thereof is omitted. In short, as shown in FIG. 2, a motor 64 is disposed to come into contact with a heater 30 in a lower part of the melting tank 12 and a stirring element 66 is set in the melting tank 12. By energizing a motor 64 during heating and reducing pressure, the stirring element 66 rotates in the melted metallic sodium 60 to generate a spiral flow 68 in the melted metallic sodium 60. The spiral flow 68 breaks at least a part of the sodium oxide layer 62 covering the entire surface of the melted metallic sodium 60, so as to make the melted metallic sodium 60 come into contact with the atmosphere inside the melting tank 12. Thus, removal of the liquid paraffin by vaporization can be achieved regardless of the presence or absence of the sodium oxide layer 62.

Thus purified metallic sodium is supplied to the reservoir tank 16 from the melting tank 12 in FIG. 1 via a purified-metallic-sodium discharge pipe 24 by opening a valve 70 and is temporally reserved in the reservoir tank 16. The purified metallic sodium in the reservoir tank 16 is supplied to a circulation line 34 via a carrier pipe 36. Under an ordinary state, a first electromagnetic valve 42 is opened and a second electromagnetic valve 48 is closed. In this state, the melted metallic sodium supplied to the circulation line 34 is supplied to a cold trap 18 through the first electromagnetic valve 42. Impurities mainly composed of a metal oxide of sodium and the like contained at a small amount in the melted metallic sodium is isolated by filtration with the cold trap 18 and the melted metallic sodium is returned to the reservoir tank 16 via a return pipe 38. The purity of the melted metallic sodium in the reservoir tank 16 is further improved by the melted metallic sodium circulating through the circulation line 34 for one or more times.

When it is required to load the cylinder 57 with the purified metallic sodium in the reservoir tank 16, the first electromagnetic valve 42 is closed and the second electromagnetic valve 48 is opened. This enables to supply the purified metallic sodium in a melting state from the carrier pipe 36 to the quantitative supply device 49 via the loading-device supply pipe 46. While the purified metallic sodium is supplied to the quantitative supply device 49, a liquid level of the purified metallic sodium rises gradually. When the liquid surface of the melted metallic sodium comes into contact with the lower end of a first liquid-level detection sensor $S_1$ having the shortest vertical length, a detection signal is transmitted to the quantitative supply valve 52 and the second electromagnetic valve 48, so as to open the quantitative supply valve 52 and close the second electromagnetic valve 48. Thereby, supply of the purified metallic sodium in the melting state to the quantitative supply device 49 is stopped and the purified metallic sodium in the melting state in the quantitative supply device 49 is supplied to the loading device 20, so as to be loaded into the cylinder 57 via the sodium dripping nozzle 54 preferably with a drop condition. This operation usually can be performed by self-weight of the melted metallic sodium, but it may be performed by applying a little positive pressure in the quantitative supply device 49 or applying a little negative pressure in the loading device 20.

When the liquid level of the purified metallic sodium in the melting state in the quantitative supply device 49 lowers to reach to the lower end of the second liquid-level detection sensor $S_2$, this is detected by the second liquid-level detection sensor $S_2$ and the quantitative supply valve 52 is closed to stop supplying the purified metallic sodium. Thereby, the cylinder 57 is loaded with a predetermined amount of the purified metallic sodium, corresponding to the vertical length of "d" of the quantitative supply device 49. At that time, by properly determining a dripping speed, a temperature of the metallic sodium in the sodium dripping nozzle 54, an inner diameter of the cylinder 57, and the amount of the purified metallic sodium to be supplied to the cylinder 57 (a diameter and length of a columnar body of the metallic sodium formed in the cylinder), a molded body of the purified metallic sodium without a microscopic air gap in a unified body can be provided, thanks to a directional solidification in the direction from bottom to the top.

Then, the cylinder 57 loaded with the predetermined amount of the purified metallic sodium is removed from the quantitative supply device 49 and replaced with a second cylinder ready to be loaded with the purified metallic sodium next. The purified metallic sodium in the melting state in the quantitative supply device 49 is supplied to the second cylinder by opening the quantitative supply valve 52 again. When the liquid level of the metallic sodium coming in contact with the lower end of a third liquid-level detection sensor $S_3$ is detected, the quantitative supply valve 52 is closed again. Thereby, the second cylinder is loaded with the predetermined amount of the purified metallic sodium, corresponding to the vertical length of "d" of the quantitative supply device 49, in a similar manner to the above first loading. By repeating such operations by a predetermined time, a constant amount of the metallic sodium can be loaded to a predetermined number of the cylinder.

In the first embodiment, the melting tank is intended for removal of the organic solvent such as liquid paraffin or the like and the cold trap 18 is intended for removal of impurities contained in the metallic sodium at a small amount and mainly composed of the metallic sodium oxides, etc. Therefore, the cold trap 18 and equipment accompanied therewith are not necessary if it is intended to remove only an organic solvent and not needed to remove the metallic sodium oxides, etc. An example for this is illustrated in FIG. 3 as the second embodiment.

Figure 3:
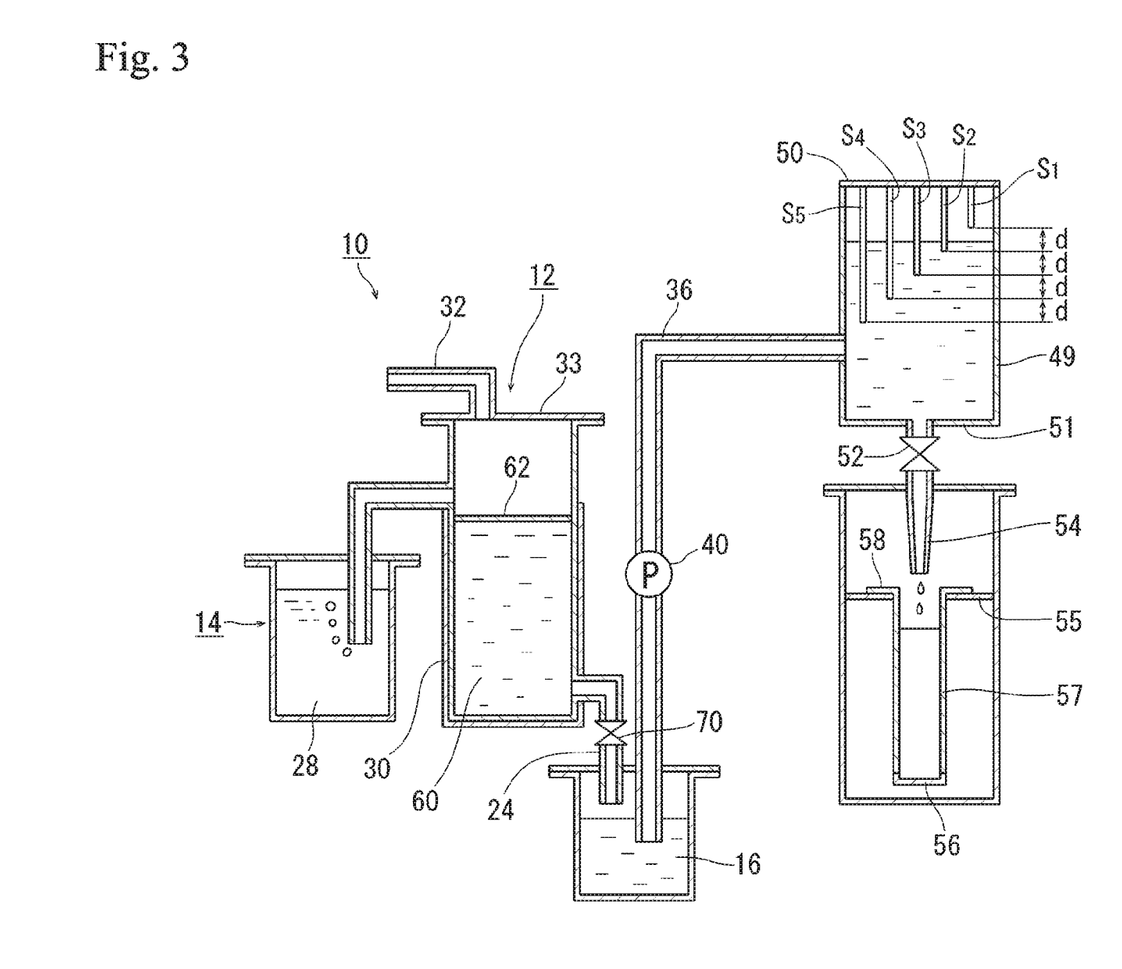
FIG. 3 is an entire constitution diagram illustrating the second embodiment of the present invention.

The second embodiment illustrated in FIG. 3 is an improvement of the first embodiment. The same components as the first embodiment are indicated by the same numeral references, and a detailed description thereof is omitted. In the second embodiment, the carrier pipe 36 is directly connected to the quantitative supply device 49 and the circulation line 34, first and second electromagnetic valves 42, 48, cold trap 18 and return pipe 38 are not connected. Supplied to the quantitative supply device 49 by activating the circulation pump 70 is the melted metallic sodium having been purified and reserved in the reservoir tank 16 in the same way as the first embodiment, in order to load it to the cylinder 57. After that, the purified metallic sodium in the melting state can be loaded into the cylinder 57 as a solidified matter having a uniform structure by a fixed quantity.

The system according to the second embodiment is remarkably advantageous in terms of space and cost compared with that according to the first embodiment. It is desirable to use the system of the second embodiment in the case where removal of metal oxides in the metallic sodium material is not needed.

EXAMPLE(S)

Hereinafter the present invention is described on the basis of the examples. However, the present invention is not limited to such examples. For example, the lid is taken off in the following examples in order to visually confirm a removal state of the liquid paraffin, this operation is not usually required.

Example 1

A melting tank for purifying metallic sodium is configured by connecting a cylindrical container with a bottom which is 250 mm in diameter and 375 mm in height with one end of a pressure-reducing suction pipe at the upper side surface and with one end of a purified-sodium take off pipe at the lower side surface. Connected to the other end of the pressure-reducing suction pipe is a solvent trap (paraffin trap) filled with liquid paraffin. Connected to the other end of the purified-sodium take off pipe is a reservoir tank for a purified metallic sodium. Further, the melting tank is provided with a heater on the bottom surface and the side surface below the pressure-reducing suction pipe of the melting tank.

Then, unpurified metallic sodium immersed in liquid paraffin is purchased and taken off from a storage container. After that, the unpurified metallic sodium is put into the melting tank from an upper opening thereof, a lid to which an inert-gas supply pipe is connected is fastened on the upper round opening to seal the melting tank, and argon gas is supplied into the melting tank from the inert-gas supply pipe, so that internal air in the melting tank is substituted by argon.

By activating a pressure-reducing pump connected to the solvent trap, the pressure in the melting tank is reduced to about −50 kPaG and kept this pressure for five minutes. After that, the lid being taken off, a gas looking like steam is observed in the melting tank. The upper opening is closed again with the lid, the pressure in the melting tank is reduced again to about −50 kPaG and kept this pressure for five minutes. After that, the lid being taken off, a gas looking like steam is not observed. The value of the reduced pressure and heating time may vary depending on the dimension of the cylindrical container with the bottom and thus is not fallen under a numerical limitation. In particular, it is needless to say, the lower the reduced pressure is, the more easily the removal of the organic solvent and thus the less a reduced-pressure keeping period.

The melting tank is gradually heated with keeping the degree of the reduced pressure by the heater and continued heating for five minutes. After that, the lid being taken off, a gas looking like a steam same as the above is observed. The upper opening is closed again with the lid, the pressure in the melting tank is reduced to about −50 kPaG again and kept this pressure for five minutes. Then, the lid being taken off, the metallic sodium is thoroughly melted and a gas looking like a steam is not observed.

Subsequently, the melting tank is gradually heated with keeping the degree of the reduced pressure by the heater to be continued heating for five minutes with rotating the stirring element under the condition where the surface of the metallic sodium is kept melting. After that, the lid being taken off, a gas looking like a steam same as the above is observed.

From these experimental results, it is found that the liquid paraffin contained in the metallic sodium cannot be removed sufficiently only by keeping the metallic sodium under the reduced pressure, and substantially all of the liquid paraffin can be removed by keeping the metallic sodium under heating state as well as the reduced pressure further with stirring the metallic sodium using the stirring element.

DESCRIPTION OF REFERENCE NUMERALS

10 System for purifying and loading metallic sodium
12 Melting tank
14 Solvent trap (paraffin trap)
16 Reservoir tank
18 Cold trap
20 Loading device
22 Pressure-reducing suction pipe
24 Purified-metallic-sodium discharge pipe
28 (Second)organic solvent
30 Heater
34 Purified-sodium circulation line
46 Loading-device supply pipe
49 Quantitative supply device
54 Sodium dripping nozzle
57 Cylinder
60 Melted metallic sodium
62 Sodium oxide layer
64 Motor
66 Stirring element
$S_1$-$S_5$ Liquid-level detection sensor

The invention claimed is:

1. A method for purifying metallic sodium coated by a first organic solvent, the method comprising steps of:
   placing the metallic sodium in a melting tank which is sealed; and
   heating the melting tank under reduced pressure to vaporize and remove the first organic solvent coating the metallic sodium,
   wherein the first organic solvent which is vaporized is introduced to a solvent trap filled with a second organic solvent and is caught in the second organic solvent.

2. A method for purifying metallic sodium according to claim 1,
   wherein a sodium oxide layer covering a surface of melted metallic sodium in the melting tank is physically removed, the sodium oxide layer being formed of a sodium oxide formed by oxidation on the metallic sodium.

3. A method for purifying metallic sodium according to claim 2, wherein a cold trap for removing sodium oxide formed by oxidation of the metallic sodium is installed downward of the melting tank.

4. A method for purifying metallic sodium according to claim 1, further comprising a step of breaking at least a part of a sodium oxide layer which is covering the surface of the melted metallic sodium in the melting tank, the sodium oxide layer being formed of a sodium oxide formed as a result of oxidation of the metallic sodium, and the sodium oxide layer being broken by applying force thereto.

5. A method for purifying metallic sodium according to claim 1, wherein a cold trap for removing sodium oxide formed by oxidation of the metallic sodium is installed downward of the melting tank.

* * * * *